US007668184B2

(12) United States Patent
Chow et al.

(10) Patent No.: US 7,668,184 B2
(45) Date of Patent: *Feb. 23, 2010

(54) METHOD AND SYSTEM FOR DESIGNING RING-BASED TELECOMMUNICATIONS NETWORKS

(75) Inventors: Timothy Y. Chow, Quincy, MA (US); Philip J. Lin, Newton, MA (US); James D. Mills, Wilmington, MA (US)

(73) Assignee: Tellabs Operations, Inc., Naperville, IL (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/537,721

(22) Filed: Oct. 2, 2006

(65) Prior Publication Data

US 2007/0076636 A1   Apr. 5, 2007

Related U.S. Application Data

(63) Continuation of application No. 09/826,748, filed on Apr. 5, 2001.

(60) Provisional application No. 60/268,201, filed on Feb. 12, 2001, provisional application No. 60/270,094, filed on Feb. 20, 2001.

(51) Int. Cl.
    *H04L 12/28* (2006.01)
(52) U.S. Cl. ....................... 370/404; 370/258
(58) Field of Classification Search ................ 370/222, 370/223, 258, 403–406, 254; 709/251; 398/4
    See application file for complete search history.

(56) References Cited

U.S. PATENT DOCUMENTS

| 5,515,367 A | 5/1996 | Cox, Jr. |
| 5,535,038 A | 7/1996 | Hinch |
| 5,546,542 A | 8/1996 | Cosares |
| 5,563,877 A | 10/1996 | Van Tetering |
| 5,657,142 A | 8/1997 | Fahim |
| 5,706,276 A | 1/1998 | Arslan |
| 5,715,432 A | 2/1998 | Xu |
| 5,717,693 A | 2/1998 | Baydar |
| 5,729,692 A | 3/1998 | Qiu |
| 5,742,774 A | 4/1998 | Al-Salameh |
| 5,793,225 A | 8/1998 | Gerson |
| 5,793,753 A | 8/1998 | Hershey |
| 5,821,937 A | 10/1998 | Tonelli |
| 5,831,610 A | 11/1998 | Tonelli |

(Continued)

OTHER PUBLICATIONS

Bela Bollobas, Modern Graph Theory, 1998, pp. 1-7 and 72-73, Springer-Verlag, New York, Inc.

(Continued)

*Primary Examiner*—Jayanti K Patel
*Assistant Examiner*—Matthew Campbell
(74) *Attorney, Agent, or Firm*—Husch Blackwell Sanders Welsh & Katz

(57) ABSTRACT

A method and system for designing a bi-connected ring-based network is provided, which designs from scratch or converts an existing network to a dual-homed ring-based network. The network covers the locations capable of being bi-connected with one or more cycles/rings. The traffic demand is then routed via the cycles, in such a way so as to minimize the amount of network traffic management equipment required.

29 Claims, 10 Drawing Sheets

U.S. PATENT DOCUMENTS

| | | | |
|---|---|---|---|
| 5,903,370 A | 5/1999 | Johnson | |
| 5,923,646 A | 7/1999 | Mandhyan | |
| 5,923,653 A | 7/1999 | Denton | |
| 5,930,016 A | 7/1999 | Brorson | |
| 6,021,113 A | 2/2000 | Doshi | |
| 6,026,088 A | 2/2000 | Rostoker | |
| 6,031,840 A | 2/2000 | Christie | |
| 6,038,678 A | 3/2000 | Fukushima | |
| 6,061,335 A * | 5/2000 | De Vito et al. | 370/258 |
| 6,073,248 A | 6/2000 | Doshi | |
| 6,081,525 A | 6/2000 | Christie | |
| 6,092,117 A | 7/2000 | Gladwin | |
| 6,098,094 A | 8/2000 | Barnhouse | |
| 6,101,012 A | 8/2000 | Danagher | |
| 6,104,699 A | 8/2000 | Holender | |
| 6,115,517 A | 9/2000 | Shiragaki | |
| 6,115,825 A | 9/2000 | Laforge | |
| 6,125,111 A | 9/2000 | Snow | |
| 6,130,764 A | 10/2000 | Taniguchi | |
| 6,130,876 A | 10/2000 | Chauduri | |
| 6,141,318 A | 10/2000 | Miyao | |
| 6,167,062 A | 12/2000 | Hershey | |
| 6,192,174 B1 | 2/2001 | Lee | |
| 6,385,649 B1 * | 5/2002 | Draves et al. | 709/224 |
| 6,567,429 B1 | 5/2003 | DeMartino | |
| 6,628,949 B1 * | 9/2003 | Park | 455/436 |
| 6,728,205 B1 * | 4/2004 | Finn et al. | 370/217 |
| 6,798,752 B1 * | 9/2004 | Pope | 370/254 |
| 6,826,158 B2 | 11/2004 | Seaman | |
| 7,302,180 B2 * | 11/2007 | Oren | 398/70 |
| 2006/0045519 A1 * | 3/2006 | Oren | 398/4 |

OTHER PUBLICATIONS

Christos H. Papadimitrious, Kenneth Steiglitz, Combinatorial Optimization: algorithms and complexity, pp. 20-23, 1982, 1998, Dover Publications, Inc. 31 E. 2nd Street, Mineola, NY.

Young-Soo Myung, Hu-Gon Kim and Dong-Wan Tcha, Optimal Load Balancing On Sonet Bidirectional Rings; Operations Research vol. 45, No. 1, Jan.-Feb. 1997, pp. 148-152.

J.W. Suurballe, R.E. Tarjan, A Quick Method for Finding Shortest Pairs of Disjoint Paths, Networks, vol. 14 (1984) pp. 325-336, John Wiley & Sons, Inc.

Thomas H. Cormen, Charles E. Leiserson, Ronald L. Rivest, Introduction to Algorithms, pp. 527-530, Massachusetts Institute of Technology, 1990.

B. Doshi, P. Harshavardhana, Broadband Network Infrastructure of the Future, IEEE Communications Magazine, vol. 36, No. 5 (May 1998), pp. 60-71.

W.D. Grover, J.B. Slevinsky, M.H. MacGregor, Optimized Design of Ring-based Survivable Networks, Can. J. Elect. & Comp. Eng., vol. 20, No. 3 (1995), pp. 139-149.

H. Luss, M.B. Rosenwein, R.T. Wong, Topological network design for sonet ring architecture, IEEE Tras. Systems, Man & Cybernetics-Part A, vol. 28, No. 6 (Nov. 1998), pp. 780-790.

X. Zhang, C. Qiao, An effective and comprehensive solution to traffic grooming and wavelenth assigment in sonet/wdm rings, SPIE Conference Boston, MA, Nov. 1998, pp. 221-232.

Synchronous Optical Network Tutorial, downloaded from www.iec.org/tutorials/sonet (last modified Mar. 1, 2000).

Fiber-Optic Technology Tutorial, downloaded from www.iec.org/tutorials/fiber.sub.—optic/index/html (last modified May 1, 2001).

Dense Wavelength Division Multiplexing Performance and Conformance Testing Tutorial downloaded from www.iec.org/tutorials/dwdm.sub—perf/index.html (last modified Mar. 1, 2001).

V.K. Balakrishnan, Schaums Outline of Theory and Problems of Graph Theory, pp. 1-5 & 28-32, 1997, McGraw-Hill Companies, Inc.

* cited by examiner

METHOD AND SYSTEM FOR DESIGNING RING-BASED TELECOMMUNICATIONS NETWORKS

CROSS-REFERENCE TO RELATED APPLICATIONS

This application is a Continuation of U.S. Ser. No. 09/826,748, filed Apr. 5, 2001, and claims the benefit of U.S. Provisional Application Ser. No. 60/268,201, filed Feb. 12, 2001, and U.S. Provisional Application Ser. No. 60/270,094, filed Feb. 20, 2001.

FIELD OF THE INVENTION

The invention pertains to methods and systems for designing ring-based communications systems. More particularly, the methods and systems pertain to designing networks with dual-homed rings from previously non-ring based networks, from scratch, or to optimize already existing dual-homed or non-dual-homed ring-based networks.

BACKGROUND OF THE INVENTION

One of the challenges facing telecommunication providers is that existing networks are continuously needing to be updated, in order to keep up with ever increasing customer demands and anticipated future demand including the demand for increased data transmission speeds and capacity. One area of technology that has been increasingly used to keep up with customer demand is the use of optical signal transmission equipment.

Beneficial features associated with the use of optical signal transmission, including the type of transmission used in fiber-optic systems, has led to their increased use in the design and implementation of communication networks. One of the benefits of optical signal transmission is the distance an unamplified optical signal can travel prior to being received. Existing glass fiber, and corresponding system electronics, enable digitized light signals to be transmitted 100 km or more without amplification. A further benefit of optical signal transmission is the volume or bandwidth of traffic that can be routed through a single signal carrying connection, like an optical fiber. Data rates of up to 10 Gbps at a single wavelength are routinely possible. Systems are available, which can support 150 or more wavelengths.

One of the earlier hurdles to designing networks incorporating early generations of fiber-optic systems, integrated as part of the public telephone network, involved the extensive use of proprietary architectures by equipment manufacturers including corresponding proprietary hardware and communication protocols. The proprietary architectures limited the ability of network users and designers, like Bell operating companies and inter-exchange carriers to integrate equipment from different suppliers into their systems, when developing or updating a network. This significantly limited the designers choices and options in terms of equipment and features after an initial proprietary scheme was selected to the available features incorporated into the equipment compatible with the proprietary scheme. In many cases this limited the network designer to equipment produced or supplied by a single vendor. As a result, it became desirable to develop a standard for which multiple manufacturers of optical network equipment could supply compatible products. One such standard for optical telecommunications transport, which was developed, is the SONET/synchronous digital hierarchy.

SONET stands for Synchronous Optical NETwork, and was formulated to provide a standard, comprehensive, synchronous digital hierarchy, which includes an optical hierarchy on top of an already existing electrical hierarchy. Furthermore this standard opened up the possibility of acquiring equipment manufactured by multiple suppliers, and integrating such diverse equipment into the same network.

As optical networks have begun to shoulder an increasing portion of the network traffic, general design principles applied to the communications systems are being more rigorously applied to the optical hierarchy layer of the communication network. One of these design principles is a desire for network survivability should a network component fail.

Traditional approaches to network survivability have included the use of redundant signal paths and equipment, and the ability to automatically reroute traffic in the event of a network failure. As a result previous point-to-point optical networks have increasingly given way to ring-based networks, which have certain inherent self-healing properties.

In a ring-based network the locations or nodes are arranged in a closed loop sequence. The last node in the sequence is connected to the first node in the sequence.

One or more of these rings or cycles are defined for a given set of locations or nodes. In a ring-based network, the locations located on a given ring, are inherently biconnected. This means that between any two locations two disjoint signal paths exist between them. More specifically in a SONET-based ring network a clockwise path and a counter-clockwise path generally exist. In SONET-based ring networks a service fiber traditionally transmits traffic data in one direction, while a protection fiber transmits traffic data in an opposite direction.

In networks where multiple rings are defined, redundant signal paths for traffic communications between rings and corresponding locations on each of the respective rings can be met by incorporating dual-homed rings or rings that are bi-connected to at least one of the other defined rings. In other words, the two rings have at least a pair of common locations present on both of the rings through which traffic can be routed. In this way, should the communication equipment associated with one of the shared locations fail and no longer be able to communicate signal traffic between rings at that location, the communication equipment at the second shared location is available for alternatively routing the traffic data between the rings.

However as the number of locations and the corresponding amount of network traffic traveling between locations increases, decisions as to how to define the rings and how to deploy the communication equipment in an efficient and a cost effective manner can become quite complex. As a result, it would be beneficial to develop a structured method and system for systematically designing relatively efficient ring-based telecommunications networks.

SUMMARY OF THE INVENTION

The present invention provides a method for designing a bi-connected ring-based network. The method includes receiving a list of locations where network traffic is at least one of originated and delivered, receiving a list of pairs of directly connected locations, and receiving a list of traffic demand between each of the listed pairs of locations. Each pair of directly connected locations defines a corresponding network traffic carrying connection. This connection includes one or more signal carrying connections between each of the directly connected locations, and a capacity for each of the network traffic carrying connections.

The method determines a dual-homed cover including one or more dual-homed cycles, where each cycle comprises a closed loop sequence of directly connected locations and corresponding network traffic carrying connections. Each location, which is capable of being bi-connected is included in at least one of the one or more dual homed cycles.

Traffic demand is then routed over the one or more cycles via the one or more of the network traffic carrying connections. A representation containing the designed bi-connected ring-based network is then either stored or outputted as a report.

In one aspect, determining a dual homed cover includes finding a list of candidate cycles, and selecting one or more of the candidate cycles from the list. In selecting the one or more of the candidate cycles, each cycle is rated, and the best rated cycle is selected. A determination is then made whether the selected cycles cover all the locations capable of being bi-connected.

If the selected cycles do not cover all of the locations capable of being bi-connected, an additional cycle is selected. The selected cycle needs to be bi-connected with at least one of the previously selected cycles, and have the best rating in combination with the previously selected cycles. The selection process is repeated for additional cycles until all locations capable of being bi-connected are covered.

In another aspect, routing the traffic demand includes grooming the traffic demand assigned to the available signal carrying connections of the one or more cycles so as to minimize the amount of network traffic management equipment required for routing the traffic demand. In connection with grooming the traffic demand, a list of traffic demand entries is created. Each traffic demand entry comprises a value of the volume of traffic and a sequence of network traffic carrying connections that the traffic traverses.

A list of signal carrying connections is also created. Each signal carrying connection comprises a traffic carrying capacity, a value corresponding to the amount of traffic already assigned, and a list of traffic management equipment supporting the already assigned traffic. The traffic demand entries are then rated with respect to the signal carrying connections having unassigned capacity. The value of the volume of traffic associated with the traffic demand entry is then assigned to the corresponding signal carrying connection having unassigned capacity.

In yet another aspect of the present invention, after the traffic demand is routed over the one or more cycles, additional traffic carrying capacity is added for each of the network traffic carrying connections, where the routed traffic demand exceeds the available capacity. Additional traffic carrying capacity can be added by adding additional signal carrying connections between the corresponding directly connected locations, or increasing the bandwidth of the existing signal carrying connections by compressing multiple data streams onto the same signal carrying connection.

The present invention further provides a system for designing ring-based communication networks. The system includes a processor of executable instructions for executing a plurality of pre-stored, executable instructions. The specifying characteristics of the communication system are received via an input device. The selected set of rings and the traffic allocated on the rings resulting from the execution of instructions by the processor are stored or communicated to a user via an output device.

The system additionally includes sets of prestored executable instructions. Some of the instructions facilitate forming a plurality of connected rings, each containing a sequence of directly connected locations or nodes. The nodes can represent multiple central offices, joined by one or more communications links, for example one or more optical fibers. Another set of instructions facilitates selection of one or more of the rings. Yet another set of instructions facilitates allocating the traffic onto the rings.

The present invention further provides a computer program including sets of executable instructions contained on a computer readable storage medium. The sets of executable instructions include a first set of instructions for receiving information defining a network. The sets of executable instructions further include a second set of instructions for forming a bi-connected representation of a network. A third set of instructions is included for forming a file defining connecting links between nodes. A fourth set of instruction is included for forming a traffic data file.

In one aspect, a further set of executable instructions facilitates the formation and selection of one or more rings for forming the bi-connected representation of the network. A still further set facilitates the processing of the traffic data file for routing the traffic through the bi-connected representation of the network.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
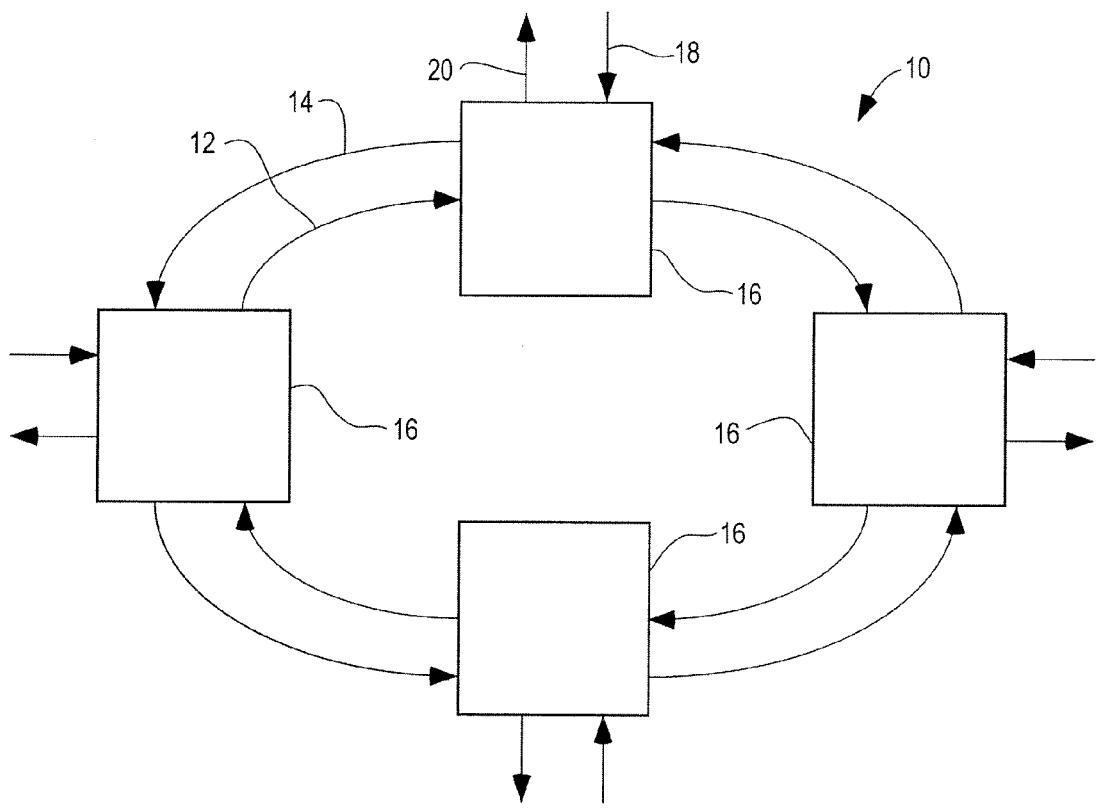
FIG. 1 illustrates an example of a simple Sonet-based ring network of the type known in the prior art.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Generally Sonet-based ring networks include multiple locations coupled together in sequence in a ring configuration, where the first location of the sequence is directly connected to the last location in the sequence. Typically associated with each location, are add-drop multiplexers which can facilitate the insertion or removal of signal traffic from the ring. The traffic can be either uni-directional or bi-directional.

As noted previously, one of the features of a ring topology is its survivability. If one of the connections is cut, the add-drop multiplexers are programmed to reroute the signal traffic by an alternative path. Given the nature of Sonet-based ring topologies, after a connection is cut signal traffic can often be automatically re-routed in a manner of milliseconds.

FIG. 1 illustrates an example of a simple Sonet-based ring network 10 of the type known in the prior art. The uni-directional version generally incorporates a pair of fibers 12 and 14 connected between each of the directly coupled locations, where one of the fibers 12 routes signal traffic in a clockwise direction, and the other fiber 14 routes signal traffic in a counter-clockwise direction. Correspondingly one of the fibers is identified as a service fiber, while the other fiber is identified as a protection fiber.

The illustrated Sonet-based uni-directional ring architecture can be readily expanded to accommodate bi-directional traffic by grouping an additional fiber connection to each of the service fiber and protection fiber. Generally within each pair of fibers forming either the service fiber connection or the protection fiber connection, one of the fibers is configured to route signal traffic in a clockwise direction, while the other fiber is configured to route signal traffic in a counter-clockwise direction.

At each of the locations where traffic is to be inserted or removed are one or more add-drop multiplexers 16. The add-drop multiplexers 16 facilitate both the insertion and removal of signal traffic onto and off of the fiber ring connections 12 and 14 via on-ramp 18 and off-ramp 20 connections.

In network topologies were multiple rings are defined, in order to route traffic from a location located on a first ring, to a location located on a second ring, and without traveling on a third ring, the first and second rings must share at least one location in common through which signal traffic can be routed between the rings. However where the rings share only a single location in common, should the equipment fail, which facilitates the routing of signal traffic between the two rings at that location, the traffic between rings would be prevented from being routed to their final destination. Consequently, network designers have incorporated the use of dual-homed connections between rings, or in other words rings which share at least two locations in common through which signal traffic between the rings can be routed.

Figure 2:
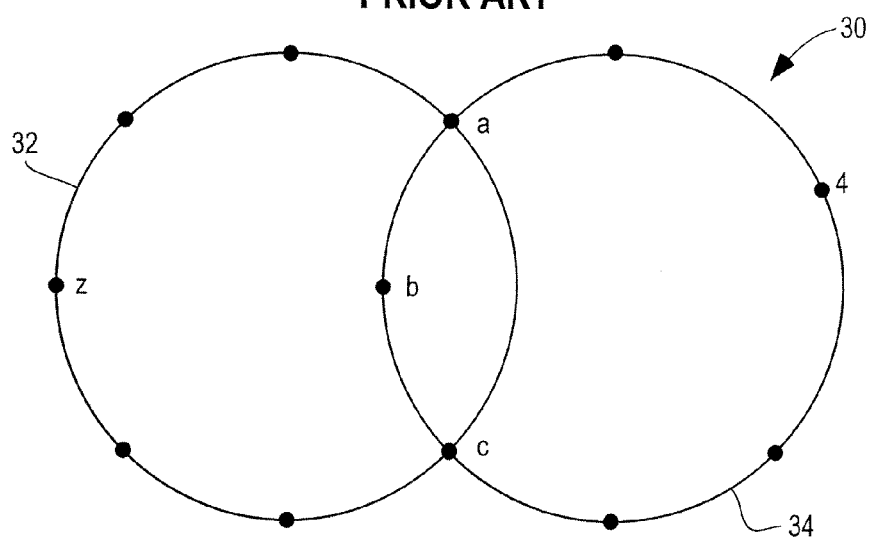
FIG. 2 illustrates an example of a pair of dual-homed rings.

FIG. 2 illustrates an example of a pair of dual-homed rings 30. A first ring 32 includes locations a, c and z. A second ring 34 includes locations a, b, c and y. The first ring 32 is capable of being dual-homed with respect to the second ring 34, because they share at least two locations in common, locations a and c. While often times the shared locations are located directly adjacent on the ring to one another, such as in the first ring 32, the shared locations do not need to be adjacent, such as in the second ring 34. Other locations, like location b, can be intermediate to the locations acting as shared locations.

Such a dual-homed configuration 30 enables traffic originating at locations z on the first ring 32 to be routed to location y on the second ring 34, via either one or both of locations a and c. If the equipment at one of the locations, like location a, were to fail, the traffic between locations y and z could be re-routed through location c.

Figure 3:
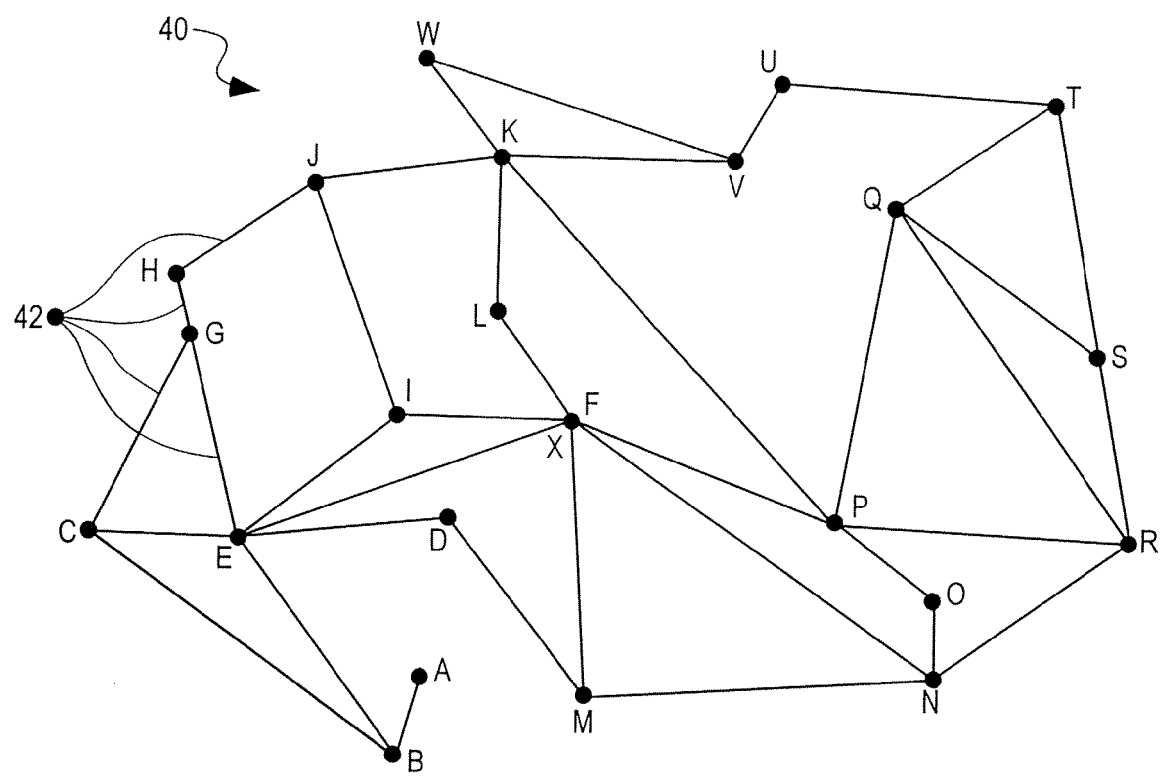
FIG. 3 illustrates a hypothetical example of an already existing point-to-point network for which conversion to a dual-homed ring-based network is desired.

FIG. 3 illustrates a hypothetical example of an already existing point-to-point network 40 for which conversion to a dual-homed ring-based network is desired. The point-to-point network 40 includes locations a-x. The network 40 additionally includes a plurality of edges 42 between various pairs of directly connected locations. The edges 42 generally correspond to already existing fiber connections between the corresponding locations.

Figure 4:
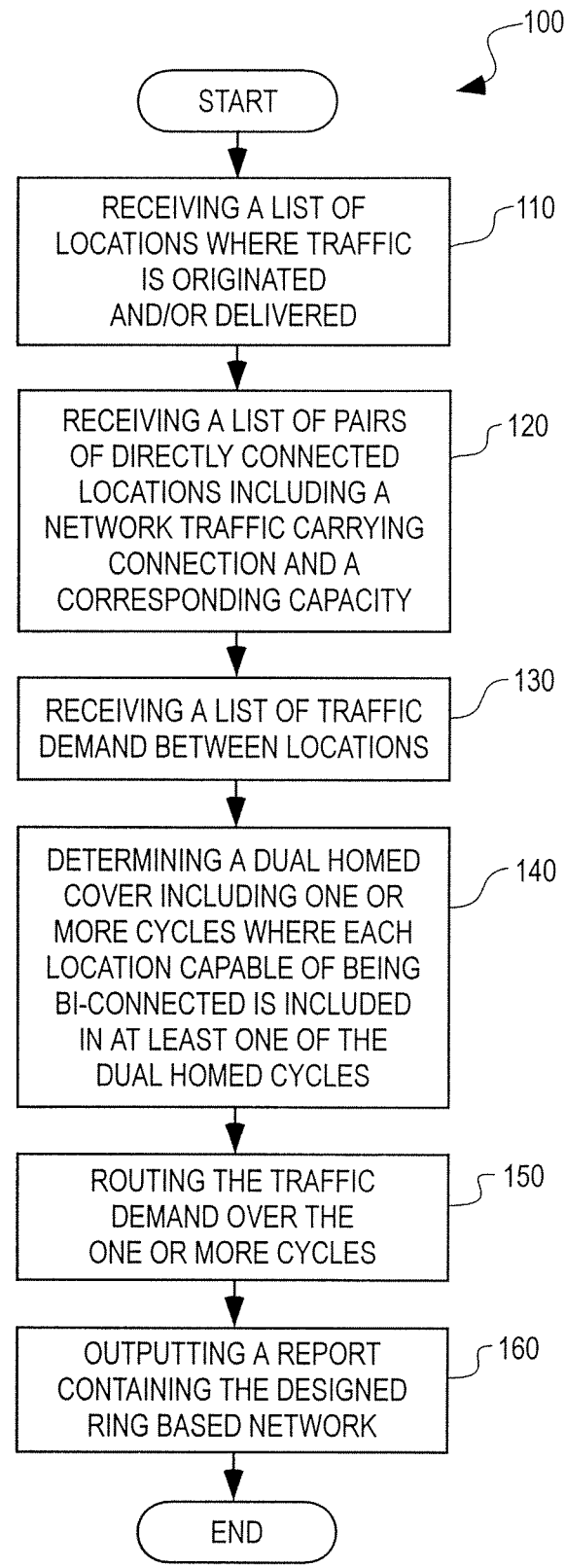
FIG. 4 illustrates a method, in accordance with the present invention, in the form of a flow diagram, which provides for the design of a ring-based network including the conversion of a point-to-point network topology to a dual-homed ring-based network topology.

FIG. 4 illustrates a method 100, in accordance with the present invention, in the form of a flow diagram which provides for the design of a ring-based network including the conversion of a point-to-point network topology to a dual-homed ring-based network topology. The method 100 initially includes receiving one or more lists describing the data associated with the locations to be included in network, the already existing connections between them, an indication of the present demand and/or the anticipated signal traffic to be routed between the locations.

In the embodiment illustrated in FIG. 4, a list is received 110 including locations where signal traffic is originated and/or delivered. In addition to the list of locations a list of pairs of directly connected locations is received 120 including a network traffic carrying connection and a corresponding network traffic capacity. A list of traffic demand traveling between locations is also received 130.

After the data describing the network to be designed is received, a dual-homed cover is determined 140, the cover includes one or more cycles/rings, where each location capable of being bi-connected, is included in at least one of the dual-homed cycles. After the cycles are selected the traffic demand is routed 150 over the one or more cycles. A report including a representation of the designed ring-based network is then outputted or stored 160.

In at least one embodiment the method is implemented as set of instructions executed within a computer. FIGS. 5A-5D illustrate representative examples of data structures, with respect to the exemplary network 40, in the form of lists and matrices, which contain the various data for describing an existing network and/or the criteria to which a new network is to be designed.

Figure 5:
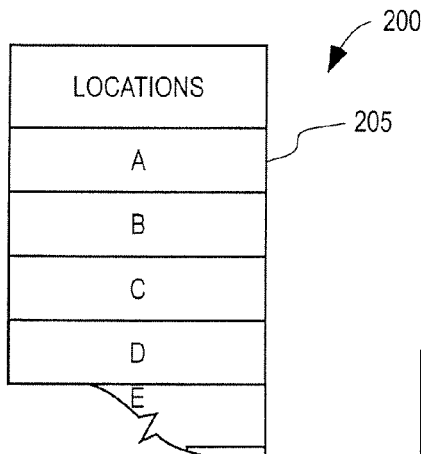
FIGS. 5A-5D illustrate representative examples of data structures in the form of lists and matrices, which contain the various data for describing an existing network and/or the criteria to which a new network is to be designed, in connection with performing the method of FIG. 4.

FIG. 5A illustrates a partial list 200 of locations, where traffic is originated and/or delivered, including a single column 205 of locations. FIG. 5B illustrates a second partial list 210 of pairs of directly connected locations including a pair of columns 215 and 220, corresponding to the pair of directly connected locations. Another column 225 includes the number of physical network traffic carrying connections between the directly connected locations, and a further column 230 including the number of physical network traffic carrying connections not presently being used.

FIG. 5C illustrates a third partial list 235 of traffic demand between locations including a pair of columns 240 and 245 corresponding to the pair of locations. A third column 250 corresponds to the traffic demand between the pair of locations.

FIG. 5D illustrates how the data describing the network may be re-formatted after the lists are read by the computer. More specifically, FIG. 5D illustrates the partial list 235 of traffic demand, shown in FIG. 5C, re-formatted as a symmetrical traffic matrix 255.

In some instances, some or all of the traffic entries in the traffic matrix 255 are increased to accommodate future anticipated growth in demand. Sometimes the traffic entries in the traffic matrix 255 are simply multiplied by a common factor, for example six. In this way, the network can provide room to grow as opposed to being made obsolete by any expansion in the traffic demand.

It is possible that any of the lists could be represented by two or more separate lists. However in these instances it is helpful if the separate lists use the same units or it is readily known how to convert the data in one of the lists so as to correspond to the data in the other similar lists. Similarly, it would also be beneficial if the related data in different lists have the same units or that they are also readily convertible.

The lists contain the data from which a network can be designed. Once received, a dual homed cover including one or more cycles can be determined 140.

Figure 6:
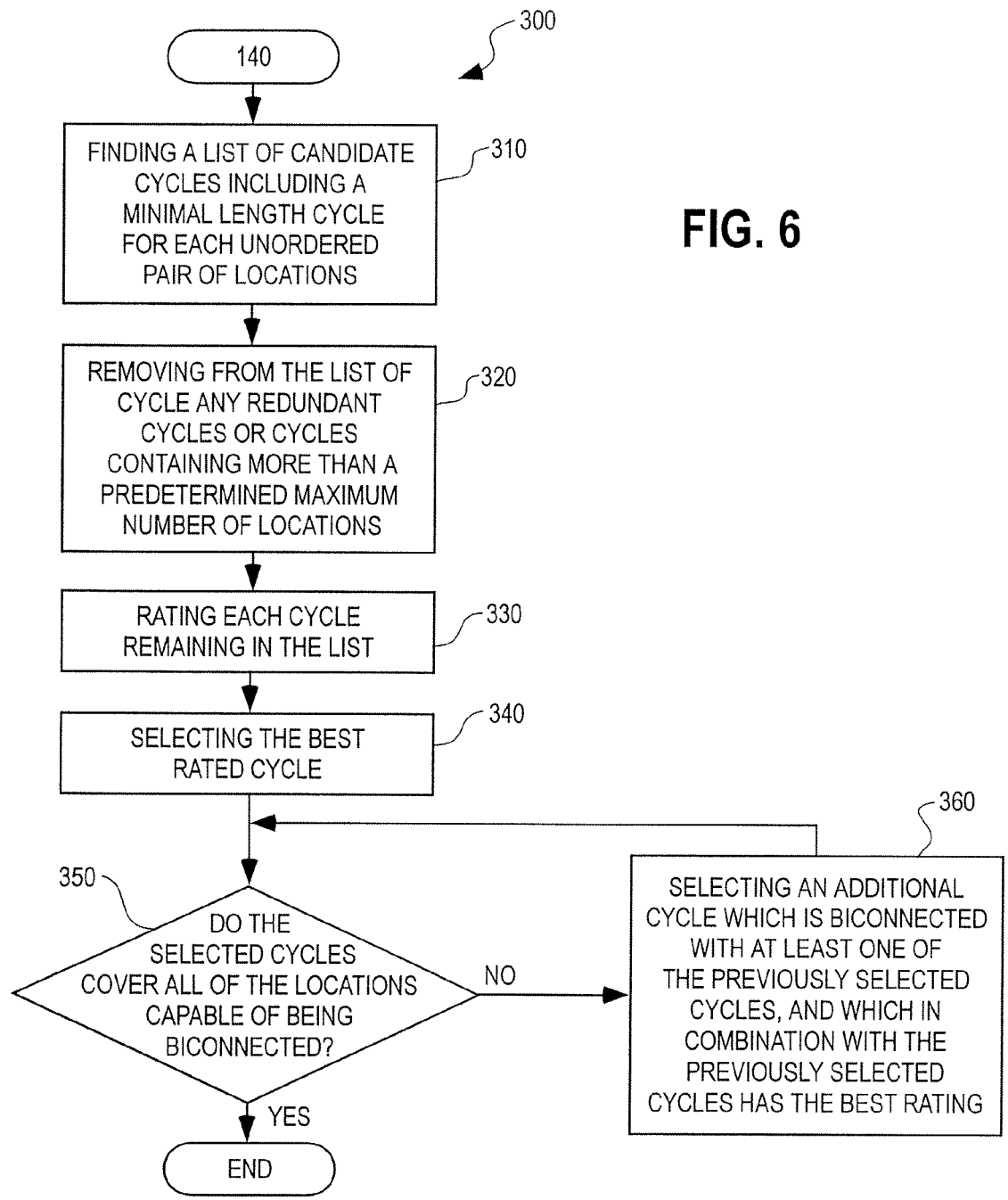
FIG. 6 illustrates a more specific flow diagram of the step for determining a dual-homed cover, illustrated in FIG. 4.

FIG. 6 illustrates a more specific flow diagram 300 corresponding to the step 140 for determining a dual-homed cover. Initially, the method 300 provides for finding 310 a list of candidate cycles. This list includes a minimal length cycle for each unordered pair of locations capable of being bi-connected.

In many instances it is desirable to eliminate any extra locations corresponding to redundantly present locations or locations which appear in the list more than once, and locations which only connect to the other locations through a single directly connected location from the list of locations to be covered by the one or more cycles from which candidate cycles are to be determined. In the first instance redundant locations may make it appear as if certain locations are capable of being bi-connected, when in fact it is only connected through a single location. In the latter instance it is not possible to define a ring which travels through a location, which is not directly connected to at least two other locations, without overlapping a portion of itself.

In at least one embodiment, finding a minimal length cycle for each unordered pair of locations includes finding the two shortest disjoint paths between each unordered pair of locations, and making the two paths separate arcs in the cycle/ring. Disjoint paths refer to paths which, separate from the locations being connected, do not include any other locations in common.

After a minimal length cycle is found for each unordered pair of locations, redundant cycles are removed 320 from the list, as well as cycles containing more than a predetermined maximum number of locations. In the latter case, at least one embodiment limits cycle/ring size to those rings having fewer than sixteen locations. Present Sonet requirements limit the number of add-drop multiplexors to sixteen. So any cycle containing more than sixteen locations is removed from the list of candidate cycles.

Redundant cycles can be more readily determined by ordering the list of locations in each of the cycles starting with the location appearing on the cycle, which would appear first in a sorted list of those locations. Similarly, the order in which the locations of the cycle are represented in the list (i.e. a list corresponding to clockwise vs. counter-clockwise travel around the cycle) is determined by listing the second location in the cycle sequence as the one of the two locations directly connected to the first location, which if the two locations were sorted, the listed second location in the sequence would appear in the sorted list first. Once each cycle has its locations listed in the above identified manner, redundant cycles would appear in the list in identical form. Once listed this way redundant cycles can be more readily identified and removed.

It is possible that as an alternative to finding only the minimal length cycles between each of the unordered pair of locations, that all cycles could be determined. However where the network to be designed is relatively large or complex this could take a large amount of processing time, and/or a large amount of processing resources like memory. Additionally the subsequent processing of the larger list of cycles, in subsequent steps in the method, would also take a longer amount of time, and make larger demands upon processing resources.

In some system designs where the design is relatively small or the computational resources available for finding a solution are relatively large it may be possible to routinely examine an exhaustive list of possible solutions. Where resources are more limited or the complexity of the network to be designed is relatively large, it may be desirable to implement a resource-limited process. Such a process, for example, selects the best solutions located (i.e. cycles) within a specified amount of time. Consequently, another alternative could determine the minimal length cycles for each unordered pair of locations. It could then allow for the list to be supplemented with other non-minimal length cycles. The supplementation could continue until a fixed amount of time allotted for finding a list of candidate cycles has transpired.

Where a similar time limitation to the processing is necessary at other steps in the method, a solution which pre-allocates only a specific portion of an overall specified amount of time can insure that the desired amount of processing time is preserved for later steps in the method.

After the redundant cycles or cycles containing more than a predetermined number of locations are removed 320, each cycle remaining in the list is rated 330. The cycle with the best rating is then selected 340. A determination 350 is then made as to whether the selected cycle(s) cover all of the locations capable of being bi-connected.

If the selected cycle(s) cover all of the locations capable of being bi-connected, the portion of the method 100 for determining 300 a dual-homed cover is complete. If the selected cycle(s) do not cover all of the locations capable of being bi-connected, additional cycles which are dual-homed/bi-connected with at least one of the previously selected cycles, and which in combination with the previously selected cycles have the best rating is selected 360, until a complete dual-homed cover is found.

Rating each of the cycles, in combination with the previously selected cycles, if any, requires that the cycle contain at least one location not contained in a previously selected cycle. If the cycle does not contain a non-covered location, for at least this selection iteration, the cycle is given a rating which precludes its selection. If other cycle(s) have been previously selected, a cycle will similarly be given a rating which precludes its selection, if the cycle is not dual-homed/bi-connected with at least one of the previously selected cycles. If the cycle includes at least one location not contained in a previously selected cycle, and the cycle is dual-homed/bi-connected with at least one of the previously selected cycles, a traffic assignment approximation is performed for determining the cycle's rating.

Traffic is assigned to the combination of previously selected cycles and the candidate cycle being rated as follows. For each of the traffic demand entries from the list 235 of traffic demand or the traffic matrix 255, the two locations between which the traffic demand is traveling are compared against the locations on each of the previously selected cycles and the candidate cycle being rated. Consideration is also given to whether the traffic would be intra-ring traffic or inter-ring traffic.

1. If none of the locations appear on any of the cycles the corresponding traffic demand is ignored.
2. If one of the locations appears on "n" of the previously selected or the candidate cycle, while the other one of the locations appears on none of the previously selected or candidate cycle, then an amount of inter-ring traffic, corresponding to the value of the traffic demand divided by "n", is assigned to each of the "n" cycles.
3. If both of the locations appear on "n" of the cycles, then an amount of intra-ring traffic, corresponding to the value of the traffic demand divided by "n", is assigned to each of the "n" cycles.
4. Finally, if one of the locations appears on "m" of the previously selected or the candidate cycles, and the other location is present on "n" of the previously selected or the candidate cycles, none of which contain both of the locations, then an amount of inter-ring traffic, corresponding to the value of the traffic demand divided by "m", is assigned to each of the "m" cycles, while an amount of inter-ring traffic, corresponding to the value of the traffic demand divided by "n", is assigned to each of the "n" cycles.

Once the traffic has been assigned to the selected and candidate cycles an approximate amount of bandwidth is computed for each cycle. The bandwidth is computed as follows. The amount of inter-ring traffic assigned to the cycle is assigned to every edge or network traffic carrying connection of the cycle.

The amount of intra-ring traffic to be assigned to each edge or network traffic carrying connection of the cycle is determined by a load balancing method described by Myung-Kim-Tcha, and published in Operations Research, Vol. 45, No. 1, January-February 1997, applied to the amount of intra-ring traffic assigned to the cycle. The inter-ring traffic assigned to each edge is added to the correspondingly assigned intra-ring traffic. The thickness of the cycle is then defined as the edge having the largest bandwidth or total amount of assigned traffic.

A fiber exhaust coefficient is then determined as the sum of thicknesses of all the selected cycles and the candidate cycle divided by the total fiber count or capacity of the selected and candidate cycles. Candidate cycles, rated in combination with the previously selected cycles, having a smaller fiber exhaust coefficient have a better rating.

Adding the inter-ring traffic to each of the edges or network traffic carrying connections of the corresponding cycle during the computation of the approximate bandwidth represents a worst case analysis in absence of sufficient data which would enable a more specific determination of the particular edges or network traffic carrying connections the inter-ring traffic would traverse.

The load balancing of network traffic, like the method described by Myung-Kim-Tcha generally only makes sense in designs implementing bi-directional rings. This is because the method described by Myung-Kim-Tcha is necessarily directed to potentially routing some of the assigned traffic in the opposite direction around the selected cycle/ring. An opposite direction, for purposes of the alternative primary routing of the traffic, is generally not available in uni-directional cycles/rings for non-failure related events.

Figure 7:
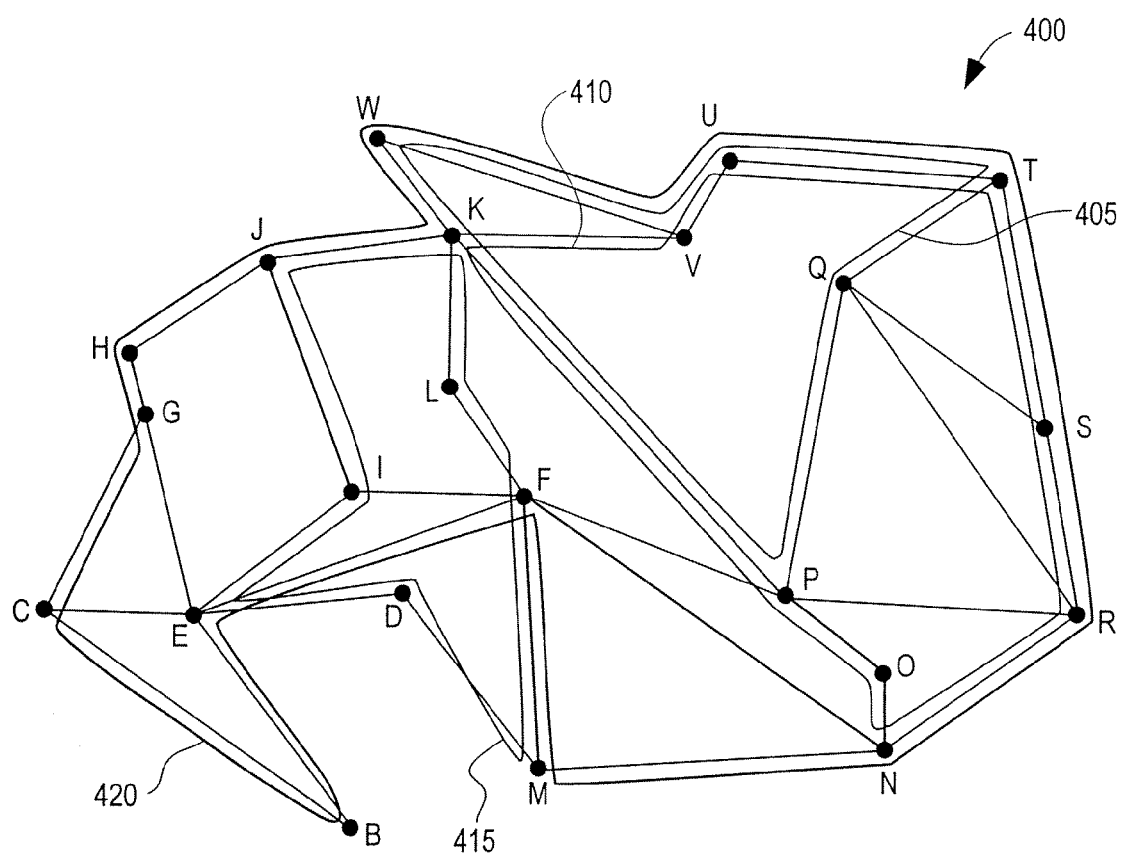
FIG. 7 illustrates an example of a dual-homed cover for the sample network topology illustrated in FIG. 3, consistent with application of the method of FIG. 4.

FIG. 7 illustrates an example of a dual-homed cover 400 for the sample network topology 40 illustrated in FIG. 3. More specifically, four dual-homed cycles/rings are identified.

A first cycle 405 traverses locations k, p, q, t, u, v and w. A second cycle 410 traverses locations k, p, o, n, r, s, t, u, and v. A third cycle 415 traverses locations d, e, i, j, k, l, f and m. A fourth cycle 420 traverses locations b, c, g, h, j, k, w, v, u, t, s, r, n, m, f and e.

The first cycle 405 is dual-homed with respect to the second cycle 410 via locations k and p. The first cycle 405 is dual-homed with respect to the fourth cycle 420 via locations u and v. The second cycle 410 is dual-homed with respect to the fourth cycle 420 via locations s and t. The third cycle 415 is dual-homed with respect to the fourth cycle 420 via locations j and k.

In at least one embodiment, where more than two locations are shared between cycles, the locations serving as the dual-homing locations are arbitrarily selected, meaning any pair of shared locations can be selected.

Figure 8:
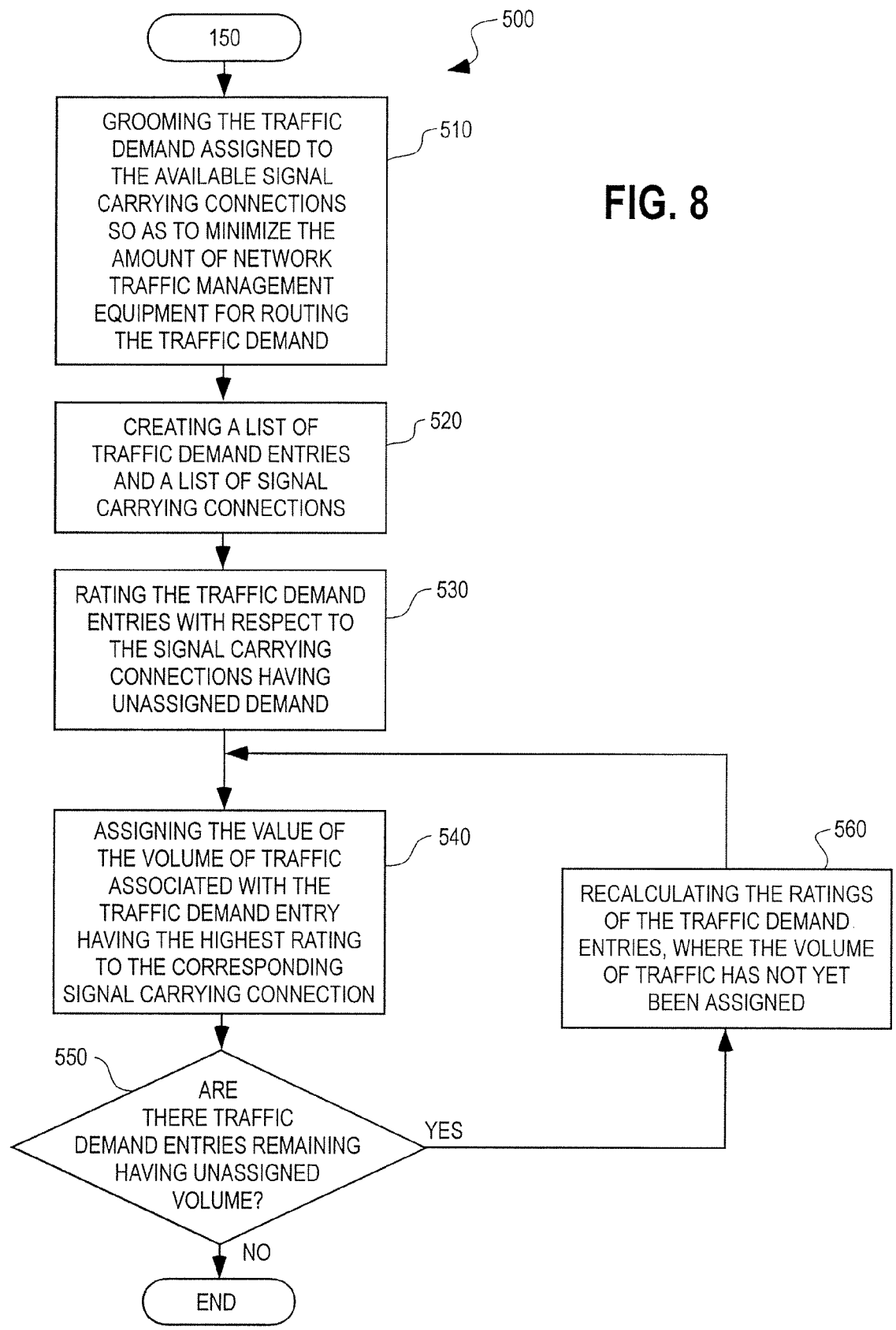
FIG. 8 illustrates a more specific flow diagram of the step for routing the traffic demand over the one or more cycles, illustrated in FIG. 4.

After the dual-homed cover is determined 140, the traffic demand over the one or more cycles is routed 150. In at least one embodiment traffic demand is routed so as to minimize the amount of network traffic management equipment required. This is called grooming the traffic. FIG. 8 illustrates a more specific flow diagram 500 corresponding to the step of routing 150 the traffic demand over the one or more cycles found in method 100.

As noted previously, one of the goals in at least one of the embodiments is to route the traffic so as to minimize the amount of network traffic management equipment required. Consistent with this goal, the more specific flow diagram 500 for routing the traffic demand over the one or more cycles 150 includes grooming 510 the traffic demand assigned to the available signal carrying connections. In connection therewith, a list of traffic demand entries and signal carrying connections is created 520.

As part of creating a list of traffic demand entries, the traffic demand in the traffic matrix between a given pair of locations is initially routed along a common path. Similarly, for each traffic demand a shortest path is initially selected, which at the same time minimizes the number of transitions between cycles.

A transition between directly connected locations in the same cycle is assigned a weight of one. A transition between cycles at a location in common to both cycles is weighted with a value that exceeds at least half the number of locations on the largest cycle, in order to discourage the number of transitions between cycles. Assigning a value that exceeds at least half the number of locations on the largest cycle discourages transitions between cycles as compared to transitions on the same cycle, because one is never further than half the distance or number of locations around a given cycle, as to between two locations on any given cycle. However, in order to keep computational matters simple, transitions between cycles at a location in common to both cycles is often weighted so as to exceed the number of locations on the largest cycle. A shortest route is then computed using the weighted transition values. It is important to remember that whenever the designated path travels inter-cycle through one of the dual-homed locations, the traffic demand must also be routed through the other dual-homed location in order to make provisions for network redundancy.

In some instances, after the traffic demand has been routed via the shortest route approach, traffic may still be rerouted away from the shortest route as part of a load balancing procedure. Corresponding conditions which make rerouting the traffic beneficial can result from circumstances where routing all of the traffic via the shortest route, would result in a disproportionate amount of traffic being routed through one or more edges of the ring, while the remainder of the ring is being under utilized. The requirements of the Sonet-based ring architecture are such that a given ring's capacity around the entire ring must equal or exceed the largest traffic demand through any one of the edges.

Figure 9:
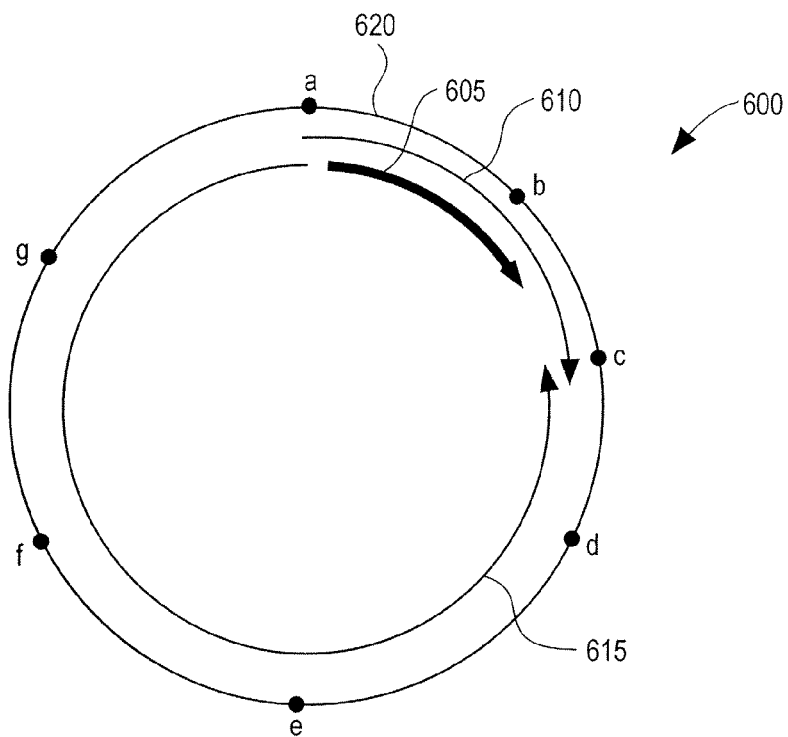
FIG. 9 illustrates an example where it may be beneficial to reroute traffic on a given cycle/ring 600 away from the shortest route in order to minimize the volume of traffic through the most heavily congested edge.

FIG. 9 illustrates an example where it may be beneficial to reroute traffic on a given cycle/ring 600 away from the shortest route in order to minimize the volume of traffic through the most heavily congested edge. In the illustrated example, two shortest route traffic paths 605 and 610 are illustrated.

The first traffic path 605, which travels from location a to location b, has a substantial amount of traffic associated with it, illustrated by the thicker arrow showing the traffic path. The second traffic path 610, which travels from location a to location c, has a significantly less amount of traffic. More importantly, for purposes of this example, it is assumed that traffic routed through the other locations d, e, f and g (paths not shown) is also relatively light.

In this example, it is beneficial to re-route the traffic demand traveling, via the second path 610, between locations a and c, counter-clockwise, via traffic path 615 and locations d, e, f and g. Routing via travel path 615 avoids the more heavily congested edge 620 between locations a and b. It may also be beneficial to reroute portions of the traffic demand traveling along traffic path 605, between locations a and b. The above-mentioned publication describing the load balancing method of Myung-Kim-Tcha goes into greater detail concerning intra-ring traffic load balancing. The technique could similarly be used to balance portions of inter-ring traffic to the extent that they travel intra-ring over portions of their path.

Figure 10:
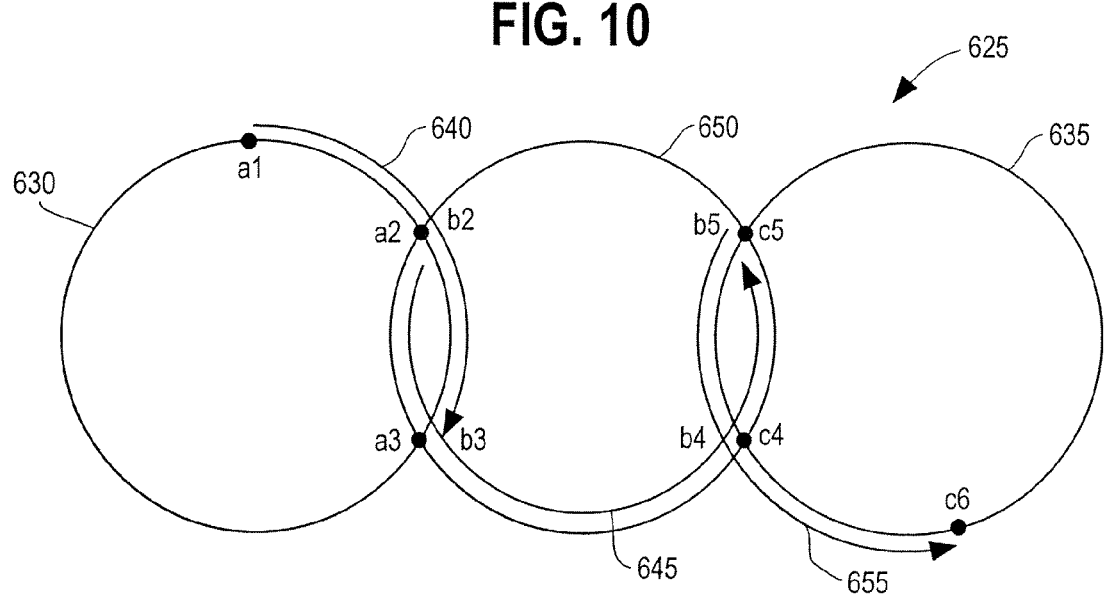
FIG. 10 illustrates three dual-homed rings, through which traffic traveling between location a1 located on cycle a is routed to a location c6 located on cycle c.

In creating 520 the list of traffic demand entries, the inter-cycle traffic paths or traffic paths which travel between two or more cycles are broken up into separate traffic demand entries which are limited to intra-cycle travel portions of the respective inter-cycle path. An example of this is illustrated in FIG. 10 where three dual-homed rings 625 are illustrated, through which traffic traveling between location a1, located on cycle 630, is routed to location c6, located on cycle 635. More specifically, the traffic demand between location a1 and location c6 are broken into three separate traffic demand entries: a first traffic demand entry, which traverses traffic path 640 through locations a1, a2 and a3 on cycle 630; a second traffic demand entry, which traverses traffic path 645 through locations b2, b3, b4 and b5 on cycle 650; and a third traffic demand entry, which traverses traffic path 655 through location c5, c4 and c6 on cycle 635. However, for routing priority purposes, even though the traffic traveling via the inter-cycle paths are being broken up into separate traffic demand entries that are restricted to a single cycle, the traffic demand entries retain their designation as inter-cycle traffic.

The traffic demand entries are then rated 530, with the traffic demand entry having the highest rating being assigned 540. If there are traffic demand entries remaining which have traffic volume not yet assigned 550, the ratings of the remaining unassigned traffic demand entries are recalculated 560, and the remaining unassigned traffic demand entry having the highest rating is assigned 540. This is repeated until all the traffic demand entries have been assigned.

Figure 11:
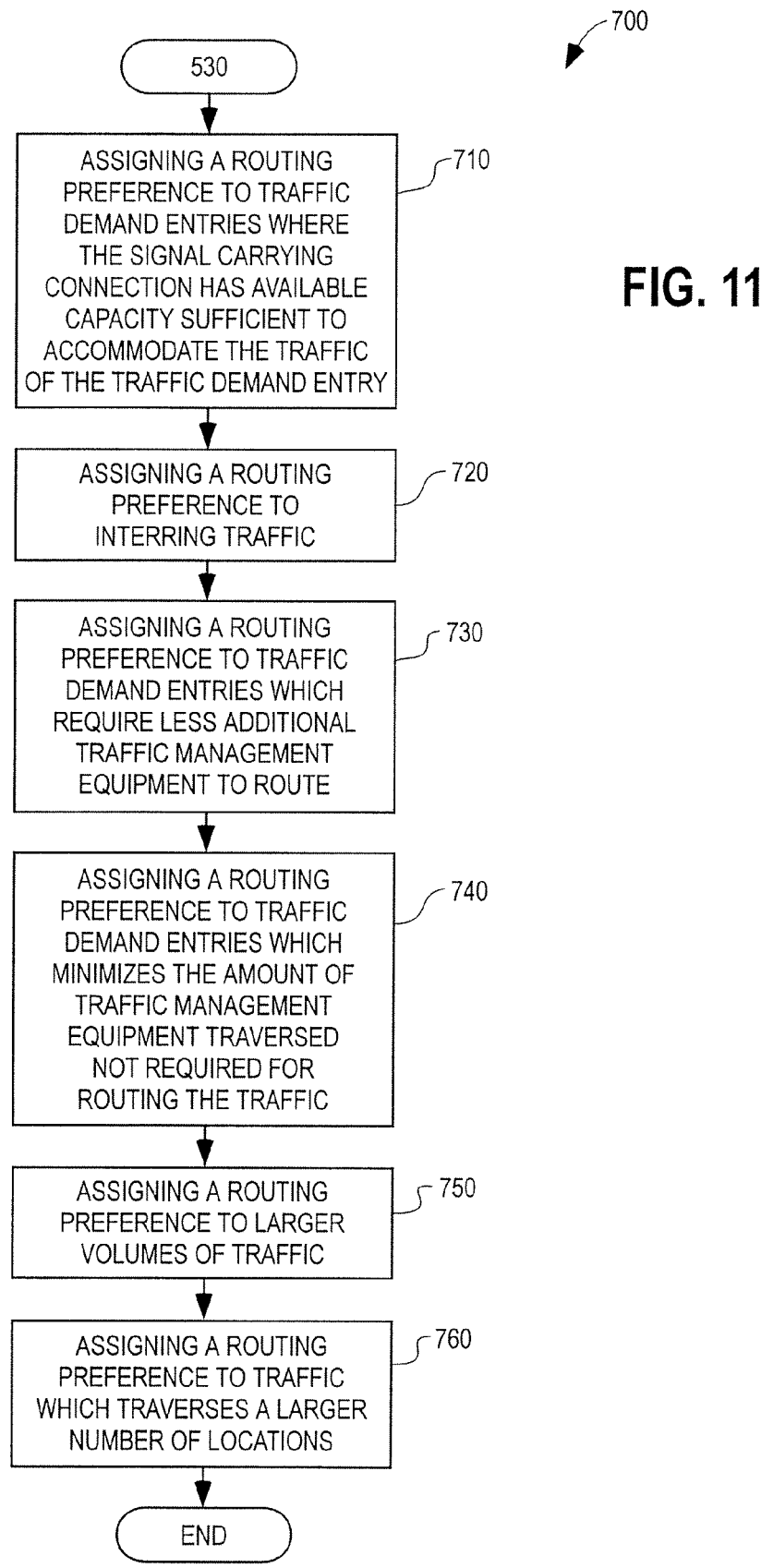
FIG. 11 illustrates a more specific flow diagram of the step for rating the traffic demand entries with respect to the signal carrying connections having unassigned demand, illustrated in FIG. 8.

The traffic demand entries are rated 530 based upon a series of criteria. FIG. 11 illustrates a more specific flow diagram 700 corresponding to the step of rating 530 the traffic demand entries with respect to the signal carrying connections having unassigned demand, found in the flow diagram 500. A description of the signal carrying connections including the already assigned traffic demand and any network management equipment is maintained in a list.

The rankings of the traffic demand entries are reviewed and analyzed using a five-tiered approach, where each tier is individually reviewed. Initially the first tier rating criteria is reviewed. If a determination of a best rated traffic demand entry can not be made after a review of the first tier rating criteria, a review of a second tier criteria is made, and so on down the line until a highest rated traffic demand entry can be determined with respect to the available unassigned capacity of the signal carrying connections.

Another way to look at this is that a rating vector is determined for each traffic demand entry. The rating vector has five components. The ratings are determined with respect to a list of partially-filled signal carrying connections routed around the ring, which could be bi-directional line switched rings. Partially filled means that the signal carrying connection could already have network traffic or traffic management equipment already assigned to it. At this point, we are unconcerned as to whether we have enough already existing physical signal carrying connections routed between the locations on the cycle/ring sufficient for routing the traffic without multiplexing multiple ring channels onto a single signal carrying connection. As new signal carrying connections are needed they are created and appended to the existing list of signal carrying connections.

Initially when ranking the traffic demand entry, a determination is made as to whether the signal carrying connection has sufficient capacity for routing the traffic demand. A routing preference is only assigned 710 to the traffic demand entry (i.e. a traffic demand is ranked) if sufficient capacity is available, with respect to one of the signal carrying connections.

The first tier of ranking includes assigning 720 a preference to traffic demand entries that are part of an inter-ring traffic flow. In the at least one embodiment, a zero is assigned to the first rating vector entry if the traffic is inter-cycle, and a one is assigned to the first rating vector entry if the traffic is intra-cycle.

The second tier includes assigning 730 a preference to traffic demand entries, which require less additional network traffic management equipment to be added to the signal carrying connection in order to route the traffic demand. This can be represented as the number of additional add-drop multiplexers which would be required. An add-drop multiplexor is minimally required at the both the location where the traffic is originated, and the location where the traffic is delivered.

Figure 12:
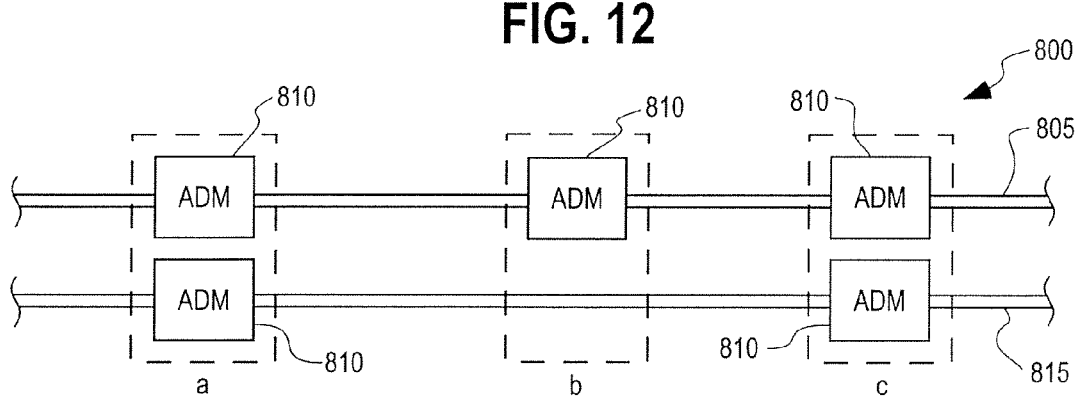
FIG. 12 illustrates two signal carrying connections traversing locations a, b and c, which represent portions of two corresponding Sonet-rings.

An example which helps to illustrate this can be seen in FIG. 12. FIG. 12 illustrates two signal carrying connections 800 traversing locations a, b and c, which represent portions of two corresponding Sonet-rings. The first signal carrying connection 805 includes an already assigned add-drop multiplexor 810 at locations a, b and c. The second signal carrying connection 815 includes an already assigned add-drop multiplexor 810 at locations a and c. The absence of an add-drop multiplexor 810 at location b on the second signal carrying connection 815 illustrates a bypass condition.

If we were attempting to apply a traffic demand which is originated at location a, and which is delivered at location b, the traffic demand entry would have a better rating with respect to the first signal carrying connection 805, because no additional network management equipment would be required, in order for the demand to be routed. However, in order for the traffic demand to be routed via the second signal carrying connection 815 would require an add-drop multiplexor 810 to be added at location b.

If we were attempting to apply a traffic demand which is originated at location a, but which is delivered at location c, based upon the second tier rating criteria, neither the first signal carrying connection 805 nor the second signal carrying connection 815 would have a distinction.

The third tier, in connection with rating a traffic demand entry with respect to a signal carrying connection, includes assigning 740 a preference to traffic demand entries, which require travel through less non-necessary network traffic management equipment in order to be routed. This can occur when traffic demand bypasses several locations where add-drop multiplexers are already assigned.

In the illustrated example of FIG. 12, using the third tier criteria, traffic which is originated at location a and is delivered to location c, would have a higher rating in connection with the second signal carrying connection 815 than the first signal carrying connection 805. This is because the first signal carrying connection has an add-drop multiplexor 810 at location b through which the traffic travelling between locations a and c would travel through, which is not needed for routing the traffic demand.

The fourth tier includes assigning 750 a routing preference to traffic demand entries having a larger volume of traffic demand. Lastly, the fifth tier includes assigning 760 a routing preference to traffic demand entries, whose traffic demand traverses a larger number of locations.

After the traffic demand entries are routed, the number of required signal carrying connections are compared against the number of available signal carrying connections (i.e. fiber). If the required number of signal carrying connections exceeds the number of available signal carrying connections, the number of signal carrying connections being routed through a particular fiber is increased. This can be accomplished by transmitting different signal carrying connections at different frequencies or wavelengths. This is called wave division multiplexing, and includes the addition of optical line terminals where multiple signal carrying connections are being multiplexed onto or off of a particular fiber. This is sometimes referred to as creating virtual bandwidth.

After the network traffic has been assigned and the necessary network traffic management equipment has been placed, the results are stored or supplied in the form of a report, which outlines the network design.

Figure 13:
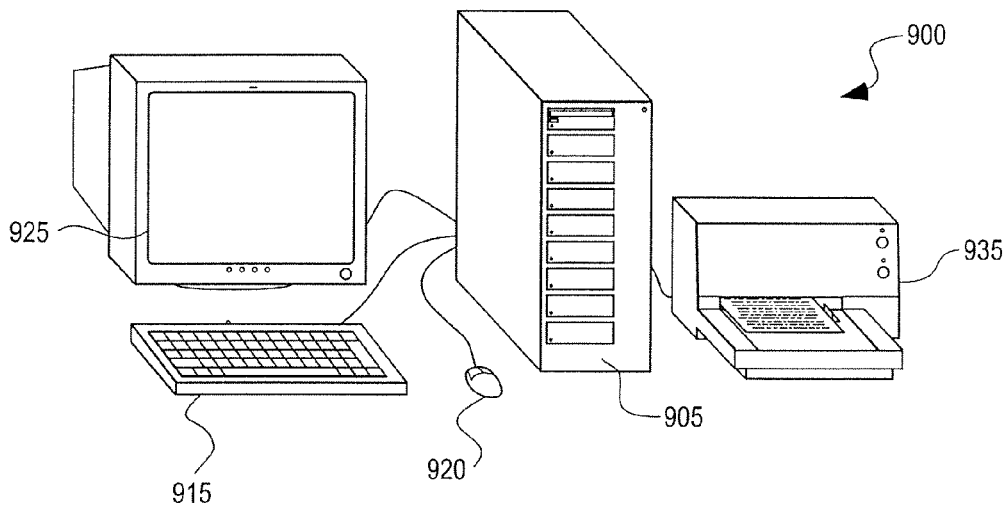
FIG. 13 illustrates an isometric view of an exemplary system including a computer for performing all or parts of the method illustrated in FIG. 4.

As noted previously, the method is of the type, which can be readily performed by a computer. FIG. 13 illustrates an isometric view of an exemplary system 900 including a computer 905 for performing all or parts of the method 100.

The system 900 additionally includes one or more input devices 910, such as a keyboard 915, a mouse 920, a touch sensitive screen 925, scanner (not shown), modem, network connection, fixed or removable storage medium, etc. The input device(s) 910 can be used for receiving the network design requirements.

The system 900 also includes one or more output devices 930, such as a display 925, printer 935, fax machine (not shown), modem, network connection, fixed or removable storage medium, etc. The output device(s) can be used for storing or outputting a report containing the results including a representation of the designed bi-connected ring-based network. The results can be stored, reported, or otherwise supplied in either user (i.e human) or computer readable form.

Figure 14:
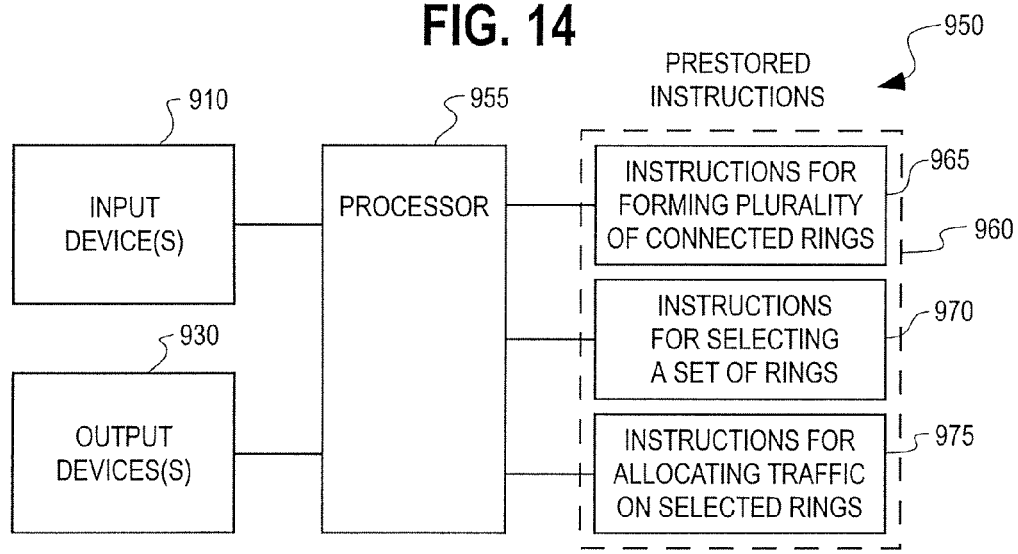
FIG. 14 illustrates a block diagram of the exemplary system illustrated in FIG. 13.

FIG. 14 illustrates a block diagram 950 of the exemplary system 900 illustrated in FIG. 13. The block diagram 950 includes a processor 955 capable of executing instruction sequences, which is generally incorporated as part of the computer 905. The processor is coupled to the one or more input device(s) 910 and output device(s) 930, for at least some of the purposes noted above. The processor is additionally coupled to a source of instruction sequences 960, which are generally prestored. The instruction sequences can be stored in such devices as traditional computer memories, including both RAM and ROM type memories, as well as could be read off of a computer data storage device, including hard disk, floppy disk, or CDROM.

The prestored instructions include instruction sequences for performing the above described method including instructions 965 for forming a plurality of connected rings, instructions 970 for selecting a set of rings, and instructions 975 for allocating traffic on the selected rings. Additional instructions sequences, not shown, include instructions for forming a minimal set of dual-homed rings covering the network, instructions for evaluating intra-ring traffic and inter-ring traffic, instructions for evaluating bandwidth requirements, instructions for determining the locations of at least one of optical multiplexers and optical terminals, and instructions for minimizing traffic flow between rings.

When the method 100 is implemented at least in part on a computer 905, the sets of instructions can include executable instructions from one or more of a variety of programming languages. One such suitable programming language for implementing the disclosed method 100 is called Maple.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method for designing a bi-connected ring-based network comprising:

receiving a list of locations where network traffic is at least one of originated and delivered;

receiving a list of pairs of directly connected locations, each defining a corresponding network traffic carrying connection including one or more signal carrying connections between each of the directly connected locations, and a capacity for each of the network traffic carrying connections;

receiving a list of traffic demand between each of the listed pairs of locations;

determining a dual homed cover including one or more dual homed cycles, each cycle comprising a closed loop sequence of directly connected locations and corresponding network traffic carrying connections, wherein each location, which is capable of being bi-connected, is included in at least one of the one or more dual homed cycles;

routing the traffic demand over the one or more cycles via the one or more of the network traffic carrying connections;

at least one of outputting a report and storing a representation containing the designed bi-connected ring-based network;

where determining includes:

finding a list of candidate cycles by finding a minimal length cycle for each unordered pair of locations;

selecting one or more of the candidate cycles from the list and, after routing the traffic demand over the one or more cycles, adding additional traffic carrying capacity for each of the network traffic carrying connections where the routed traffic demand exceeds the available capacity.

2. A method in accordance with claim 1 wherein adding additional traffic carrying capacity includes adding additional signal carrying connections between the corresponding directly connected locations.

3. A method in accordance with claim 2 wherein adding additional signal carrying connections between the corresponding directly connected locations includes routing additional fiber or wire connections between two directly connected locations.

4. A method in accordance with claim 1 wherein adding additional traffic carrying capacity includes increasing the bandwidth of the existing signal carrying connections between the corresponding directly connected locations.

5. A method in accordance with claim 4 wherein increasing the bandwidth of existing signal carrying connections includes compressing multiple data streams onto the same signal carrying connection between the corresponding directly connected locations.

6. A method in accordance with claim 5 wherein compressing multiple data streams onto the same signal carrying connection includes transmitting each of the data streams using a different carrier frequency or wavelength.

7. A method in accordance with claim 1 wherein finding a list of candidate cycles additionally includes removing from the list of candidate cycles any redundant cycles.

8. A method in accordance with claim 1 wherein finding a list of candidate cycles additionally includes removing any cycles containing more than a predetermined maximum number of locations in the cycle sequence.

9. A method in accordance with claim 1 wherein routing the traffic demand includes grooming the traffic demand assigned to the available signal carrying connections of the one or more cycles so as to minimize the amount of network traffic management equipment required for routing the traffic demand.

10. A method in accordance with claim 9 wherein grooming the traffic demand includes grouping network traffic originating from a common source location and being delivered to a common destination location onto the same signal carrying connections.

11. A method in accordance with claim 9 wherein the network traffic management equipment includes one or more of add-drop multiplexers and optical line terminals.

12. A method in accordance with claim 1 where in each of the one or more dual homed cycles has at least one location which is present in no other cycle.

13. A method in accordance with claim 1 wherein the traffic demand to be routed is determined by multiplying an already existing demand between each of the locations by a common multiple.

14. A method of designing networks comprising:
defining and storing a plurality of network nodes;
defining and storing a plurality of traffic limited links between the nodes;
defining a plurality of dual-homed communications rings formed of nodes joined by links;
specifying and storing system traffic;
allocating traffic on the links in accordance with link capacity to support the specified traffic; and
storing a representation of at least the rings in a writeable medium; and
which includes representing the nodes and links as a graph having weighted edges wherein the weightings of the edges correspond to numbers of fibers in respective links,
wherein a pre-stored minimal length criterion is applied to the rings and wherein a set of minimum length rings is selected and stored and which includes defining locations of traffic add/drop ports in accordance with a pre-determined criterion.

15. A method as in claim 14 which includes displaying the rings in human discernable form.

16. A method as in claim 14 which includes specifying the rings in a multi-dimensional matrix and storing the matrix in a writeable medium.

17. A method as in claim 14 which includes storing the traffic as a matrix in a writeable medium.

18. A method as in claim 17 which includes establishing those rings which include first and second common nodes, and, allocating traffic between those nodes among those rings.

19. A method as in claim 18 wherein the traffic between those first and second nodes is allocated equally among those rings.

20. A method as in claim 18 which includes establishing rings which include a third node, but not a fourth node and those rings which include the fourth node but not the third node and allocating traffic between those nodes to the respective ones of those rings.

21. A method as in claim 18 which includes establishing a bandwidth parameter for each ring for traffic allocated thereon.

22. A method as in claim 21 which includes establishing a required bandwidth parameter for each link of each ring and storing same in a writeable medium.

23. A method as in claim 17 which includes selecting pairs of nodes shared by respective pairs of rings in support of inter-ring traffic.

24. A method as in claim 23 which includes selecting a minimal length traffic route between first and second nodes in accordance with a pre-determined criterion.

25. A method as in claim 24 which includes assigning a first weight to adjacent vertices in a selected ring and a greater weight to common vertices of first and second rings and wherein traffic between selected vertices is routed on a minimal weight path therebetween.

26. Software pre-stored on a computer readable storage medium, for designing communications networks comprising:
a computer readable storage medium;
a first plurality of stored executable instructions pre-stored on the medium, for receiving information defining a network including a plurality of nodes joined by connecting communications links including an indicium of the number of communications paths in each link and a multi-dimensional representation of a traffic pattern;
a second plurality of stored, executable instructions pre-stored on the medium, for forming a biconnected representation of the network;
a third plurality of stored, executable instructions pre-stored on the medium, for forming a file defining connecting links between nodes; and
a fourth plurality of stored executable instructions pre-stored on the medium, for forming a traffic data file; and
which includes a plurality of instructions pre-stored on the medium, for forming a minimal set of dual-homed rings covering the network in accordance with a predetermined criterion and which includes a plurality of instructions for evaluating intra-ring traffic and inter-ring traffic.

27. Software as in claim 26 which includes a plurality of instructions pre-stored on the medium, for evaluating bandwidth requirements on links of the rings in response to the traffic data file.

28. Software as in claim 26 which includes a plurality of instructions pre-stored on the medium, for minimizing traffic flow between rings.

29. A method comprising:
- establishing a plurality of locations of traffic add/drop ports in accordance with a previously determined criterion;
- establishing a plurality of dual homed cycles which cover at least some of the locations;
- establishing a dual homed cover which includes at least some of the members of the plurality;
- selecting one or more cycles, wherein selecting one or more cycles comprises:
  - rating each cycle;
  - selecting the best rated cycle;
  - determining if the selected cycles cover all the locations capable of being bi-connected;
  - if the selected cycles do not cover all locations capable of being bi-connected, selecting an additional cycle, which is bi-connected with at least one of the previously selected cycles, and which in combination with the previously selected cycles has the best rating, and
  - repeating the selection process for additional cycles until all locations capable of being bi-connected are covered.

* * * * *